United States Patent [19]
Kato et al.

[11] Patent Number: 5,690,771
[45] Date of Patent: Nov. 25, 1997

[54] ELECTRONIC PARTS SUCH AS AN INDUCTOR AND METHOD FOR MAKING SAME

[75] Inventors: Ikuo Kato; Kenichiro Nogi, both of Tokyo, Japan

[73] Assignee: Taiyo Yuden Kabushiki Kaisha, Tokyo, Japan

[21] Appl. No.: 434,985

[22] Filed: May 4, 1995

Related U.S. Application Data

[63] Continuation-in-part of Ser. No. 219,677, Mar. 29, 1994, abandoned.

[30] Foreign Application Priority Data

Mar. 31, 1993 [JP] Japan ..................... 5-094959
Dec. 27, 1993 [JP] Japan ..................... 5-348849
Mar. 11, 1994 [JP] Japan ..................... 6-067539

[51] Int. Cl.$^6$ ..................... B29E 47/00; B22D 11/00
[52] U.S. Cl. ..................... 156/244.11; 156/244.12; 156/244.24; 156/244.25; 164/284; 164/249; 164/461; 264/271.11; 264/272.19
[58] Field of Search ..................... 156/89, 244.11, 156/244.18, 242, 244.12, 244.24, 244.25; 428/156; 264/104, 60, 61, 176.1, 211.12, 271.1, 271.11, 272.19; 164/249, 284, 423, 461

[56] References Cited

U.S. PATENT DOCUMENTS 4,004,631  1/1977  Goodrich et al. ............ 164/250
4,139,047  2/1979  Parrish ..................... 164/147
4,491,819  1/1985  Ray ........................ 336/110

Primary Examiner—Donald Loney
Attorney, Agent, or Firm—Armstrong, Westerman, Hattori, McLeland & Naughton

[57] ABSTRACT

Electronic parts such as an inductor of improved connectivity between magnetic and conductive materials made by sintering the magnetic material under a condition where no accumulation is developed, by forming a hollow-core of a shape different from an external shape of said conductive material through said magnetic material to be molded by an extrusion-molding means while inserting said magnetic material into said hollow-core, or by providing an erasable means to be removed by a heat treatment in said conductive material and conducting extrusion molding so as to embed said conductive material into said magnetic material, said erasable means being removed during a sintering treatment to form a space between said conductive material and said magnetic material, and a method for making same.

4 Claims, 9 Drawing Sheets

ELECTRONIC PARTS SUCH AS AN INDUCTOR AND METHOD FOR MAKING SAME

This application is a Continuation-in-Part of U.S. application Ser. No. 08/219,677, filed Mar. 29, 1994, priority of which is claimed hereunder, and abandoned now.

BACKGROUND OF THE INVENTION

1. Field of the Invention

This invention relates to electronic parts such as an inductor used for eliminating electro-magnetic interference generated within signal lines of electronic equipment, and a method for making same.

2. Description of the Related Art

A number of such electronic parts for noise rejection and their methods for making have been proposed in the art as in the following.

A typical example of conventional methods is that a mixture of ferrite and a binder is charged to a mold in which a metal line, for example, a platinum line, has previously been arranged, followed by compression molding, fitting of external electrodes and sintering to form ferrite bead inductors provided with a through-hole type electrode therein (conventional example 1).

In an another example, a kneading mixture of ferrite powder and a resin binder is charged to an extrusion mold in which a metal line has been arranged, followed by extrusion molding of thus kneaded mixture with the metal line pierced therein from an extruder head, cutting to a desired length, fitting external electrodes and sintering to form electronic parts (conventional example 2). A conventionally produced electronic part is shown in FIG. 7(A).

Such electronic parts further include those disclosed in a Japanese Patent Kokai No. 63-226,904 (conventional example 3) as an example of a tip inductor in which a conductive metal wire is embedded into a ferrite material. In this inductor, a magnetic layer is monolithically adhered to a periphery of a conductive material by extrusion molding to form a molded part in continuous length as an inductance element.

Although such electronic parts can be produced by conventional methods, there are still problems to be solved, as will be described below.

The first problem is caused by the metal line. According to conventional examples, the molded material comprising the metal line (L') embedded therein is cut into a desired length. As the metal line (L') is fine, it tends to fall off from the ferrite molded material due to vibration or shock during the subsequent process to fit terminals.

The second problem is caused by the sintering treatment. When the mixture of ferrite and a binder is sintered at a temperature of, for example, 800° C. to 1200° C., the ferrite material shrinks itself about 15% and on the contrary, the metal line in the molded material expands several percent. As a result, the metal line breaks the external electrodes (T') fitted to both sides of the material which allows both cut ends of the line to protrude outside as shown in FIG. 7(A). Such a protrusion of the line hinders a uniform deposition of the external electrodes on the material during the dipping treatment. Especially, if the line (L') protrudes exclusively from one side of the ferrite core as shown in FIG. 2(B), dimensional size of the external electrodes varies widely, which would cause failure of soldering such as so-called Manhattan phenomenon.

The third problem is caused by an incomplete contact between the external electrodes and the conductive material. As an area used for their contact is small and is thus called as "point contact", each electronic part would be deflected to disconnect between the electrodes and the conductive material when a circuit substrate consisted of such parts is bent intentionally.

Further, in the conventional example 3 described above, the magnetic layer is adhered throughout the outer periphery of the conductive material by extrusion molding, which results in internal stress between these two materials due to a difference in shrinkage factor thereof during a sintering treatment of the magnetic material. This should result in poorer adhesive properties between two materials and a decrease in, for example, the intrinsic impedance properties, which leads to deterioration of products although usefulness of the inductance element is not remarkably spoiled.

Conventional problems as described above can be solved and electronic parts such as an inductor in higher quality are provided by the present invention.

SUMMARY OF THE INVENTION

It is an object of this invention to provide electronic parts in which failure of contact due to a protruded conductive material from electrodes is avoided by flattening a sintered protrusion of the conductive material embedded in a magnetic material and then fitting external electrodes.

Another object of this invention is to provide electronic parts in which external electrodes are fitted uniformly by leveling a protrusion rate of the conductive material.

Further object of this invention is to provide electronic parts in which external electrodes and a conductive material are connected firmly enough to produce in commercial quantity.

Still further object of this invention is to provide electronic parts in high quality in which no accumulation of internal stress is developed during a sintering treatment even under a condition different thermal expansion coefficient between the conductive material and the magnetic material.

These and other objects can be achieved by this invention. The most characteristic features are as in the following.

(1) A method for making electronic parts comprising:

supplying a conductive material to an extruding means where a pasty magnetic material is to be charged;

extruding said magnetic material with said conductive material to be embedded therein to mold an intermediate;

sintering said intermediate to form a sintered material thereby partially exposing both external end surface of said magnetic material;

subjecting a protrusion of said conductive material to a flattening treatment and connectively fitting external electrodes to both end surfaces of said sintered material.

(2) A method as recited in claim 1 wherein a center portion of said intermediate is pressed to reduce width thereof transverse to the longitudinal direction.

(3) A method as recited in claim 1 wherein said electric part consists of an inductor.

(4) A method as recited in claim 1 wherein said conductive material is Pt, Ag, Pd or alloy thereof.

(5) Electronic parts such as an inductor consisting of a conductive material arranged in a magnetic material such as ferrite, said electronic parts comprise a gap formed between said magnetic material and said conductive material.

(6) A method for making electronic parts such as an inductor consisting of a conductive material arranged in a magnetic material which comprises forming a hollow-core of a shape different from an external shape of said conductive material through said magnetic material to be molded by an extrusion-molding means while inserting said magnetic material into said hollow-core.

(7) A method for making electronic parts such as an inductor consisting of a conductive material arranged in a magnetic material which comprises providing an erasable means to be removed by a heat treatment in said conductive material and conducting extrusion molding so as to embed said conductive material into said magnetic material, said erasable means being removed during a sintering treatment to form a gap between said conductive material and said magnetic material.

Electronic parts of this invention can be obtained by extruding a magnetic material such as ferrite comprising a conductive material embedded therein to form an intermediate which is then sintered, subjected to a flattening treatment to reduce a protrusion of the conductive material and fitting external electrodes. Further, a nearly center part of an intermediate is pressed to reduce width thereof transverse to the long direction to improve consolidation thereof.

Furthermore, the conductive material may be embedded into the magnetic material in an extrusion molding means so as to leave a space between two materials followed by a sintering treatment. Alternatively, the conductive material provided with an erasable means therein, removable by sintering, may be embedded into the magnetic material and then subjected to the sintering treatment. No accumulation of internal stress is developed between the conductive material and the magnetic material during the treatment described above.

According to this invention, the conductive material embedded into magnetic material is sintered so stably that the former never slips out or fall out from the latter, which is then fitted with external electrodes to complete electronic parts. These electronic parts are conveniently used for a circuit substrate without accompanying failure of soldering such as Manhattan phenomenon, and even if such a circuit substrate is intentionally bent, disconnection between the external electrodes and the conductive material does not occur. Accordingly, products of high quality can be provided by this invention. In addition, as the molding material is extruded while keeping a proper allocation in the conductive material, an increased productivity and an effective cost down can be realized easily by the present process.

Further, although there exists a difference in the thermal expansion coefficient between the conductive material and the magnetic one, no accumulation of internal stress is developed therein, which allows to provide the electronic parts in high quality.

PREFERRED EMBODIMENTS OF THE INVENTION

Reference is now made to a preferred embodiment of this invention.

EXAMPLE 1

Figure 1:
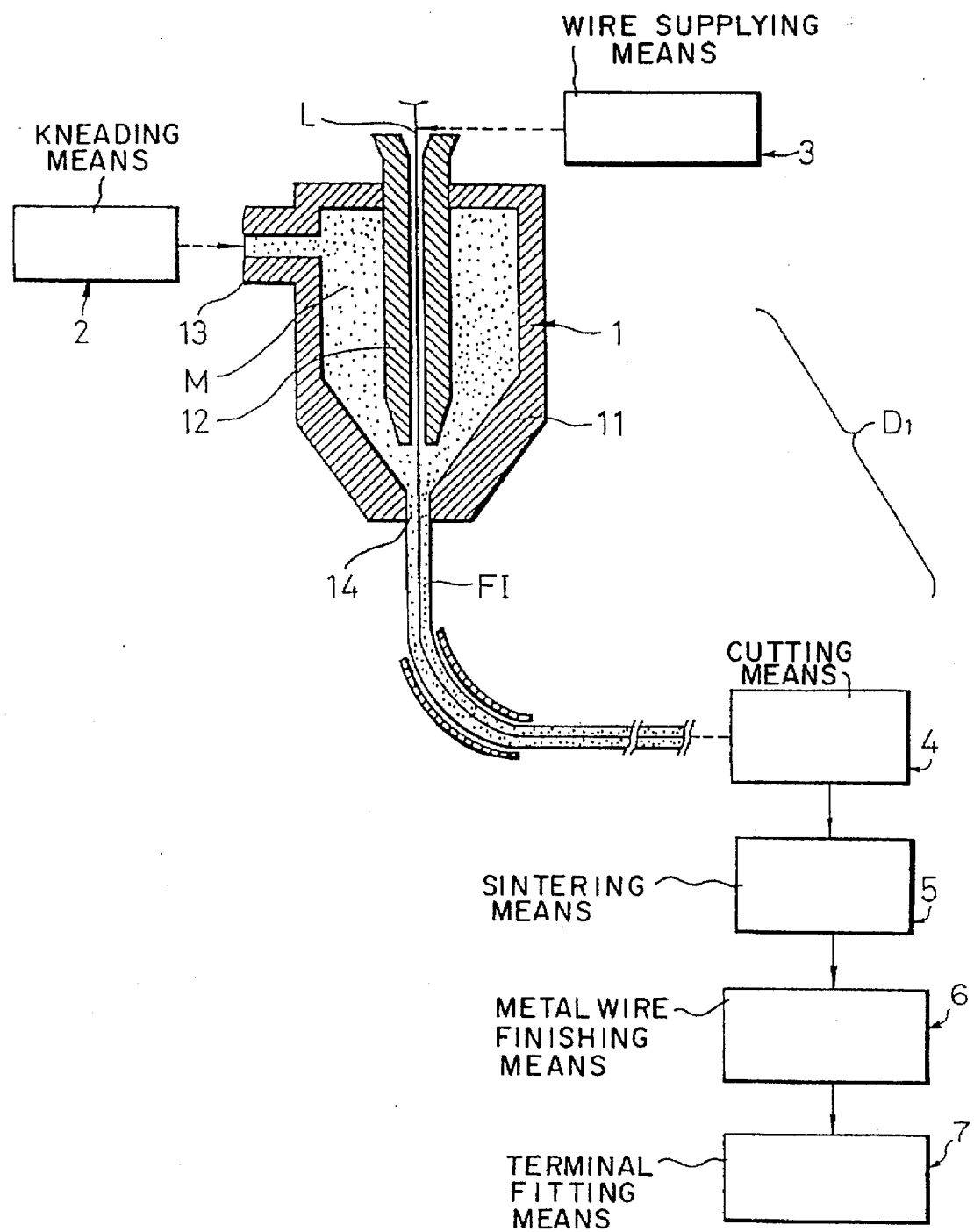
FIG. 1 is a block diagram of a production device used in Example 1.
Figure 2:
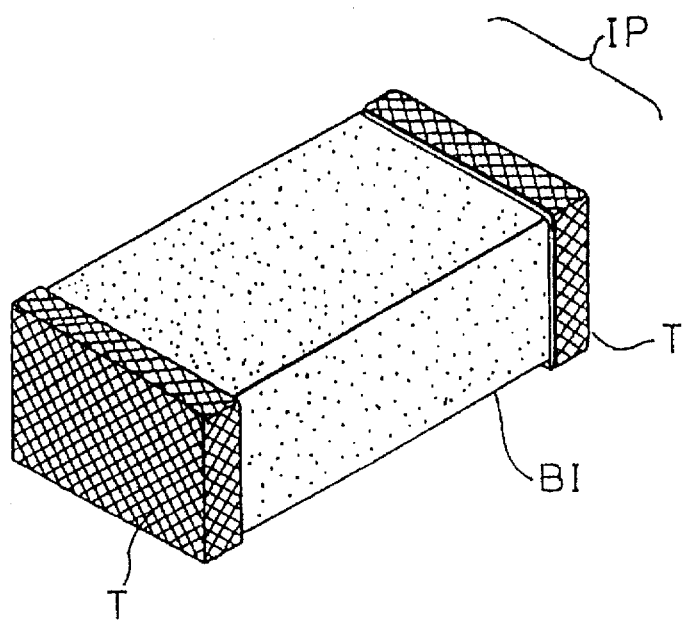
FIG. 2 is a perspective view of an inductor produced according to Example 1.

According to the first example of this invention, a device ($D_1$) shown in FIG. 1 is used to produce an inductor (IP) shown in FIG. 2.

Figure 3A:
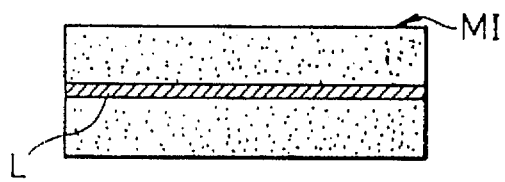
FIGS. 3(A)–(D) are section views of an inductor in each productive step of Example 1.

A cylindrical guide (12) for a conductive material (L) is arranged vertically in an molding housing (11) of an extruding means (1). A conductive platinum material (L) having a diameter of about 0.1 mm is supplied to the cylindrical guide (12) from a line supplying means. On the other hand, a pasty magnetic material (M) such as Ni—Zn ferrite is charged to the extruding means (1) from a kneading means (2). A molded material (FI) of the magnetic material extruded from an extruding end (14) is cut into a rectangular parallelepiped having an external dimension of about 3.8×1.9×1.3 cm, by use of a cutting means (4) such as a rotary whetstone, as an intermediate (MI) in which the conductive material (L) is embedded in the ferrite molded material (FI) as shown in FIG. 3(A). It is apparent from FIG. 3(A) that the conductive material (L) is secured in the intermediate (MI) stably enough so as to not easily slip out or fall out because the conductive material (L) is embedded under a high pressure during an extrusion molding process to form the molded material (FI).

Figure 3B:
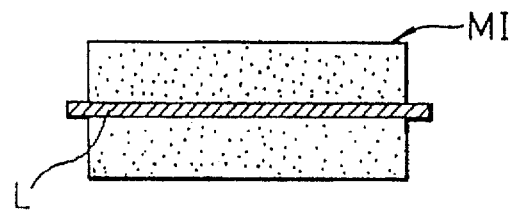

When the intermediate (MI) is sintered at a temperature of, for example, about 800° C. to 1,200° C. in a sintering means (5), the ferrite molded material (FI) in the intermediate (MI) is shrunk to form a sintered material (BI) having an external dimension of about 3.2×1.6×1.1 cm thereby the conductive material (L) being broken out of both end surfaces at a length of about 0.3 mm as shown in FIG. 3(B).

Figure 3C:
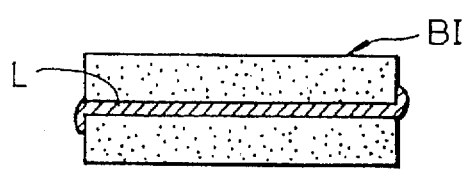
Figure 3D:
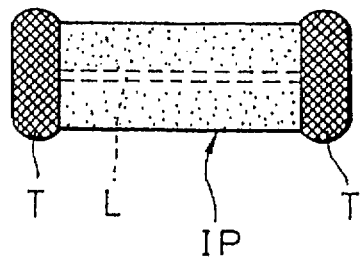
Figure 7A:
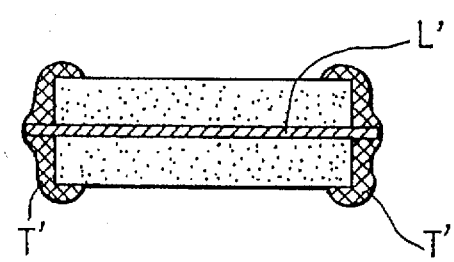
FIGS. 7(A) and (B) are section views of inductors produced by a conventional process.
Figure 7B:
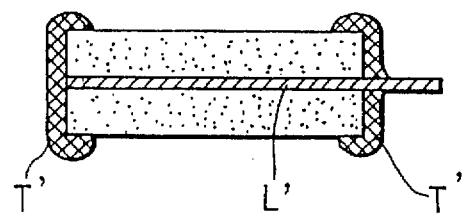

The conductive material (L) protruded from the sintered material (BI) is pressed by use of a metal line treating means (6) to bend on both end surfaces as shown in FIG. 3(C).

Finally, both end surfaces of the sintered material (BI) is treated through, for example, a dipping treatment in a terminal fitting means (7) to apply an Ag paste for soldering and fitted with external electrodes (T) to complete an inductor (IP) as shown in FIG. 2.

EXAMPLE 2

Figure 5:
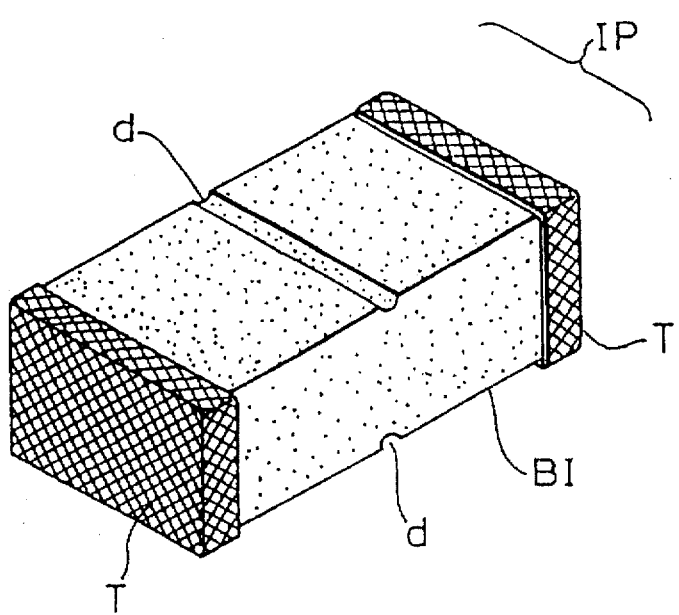
FIG. 5 is a perspective view of an inductor produced according to Example 2.
Figure 4:
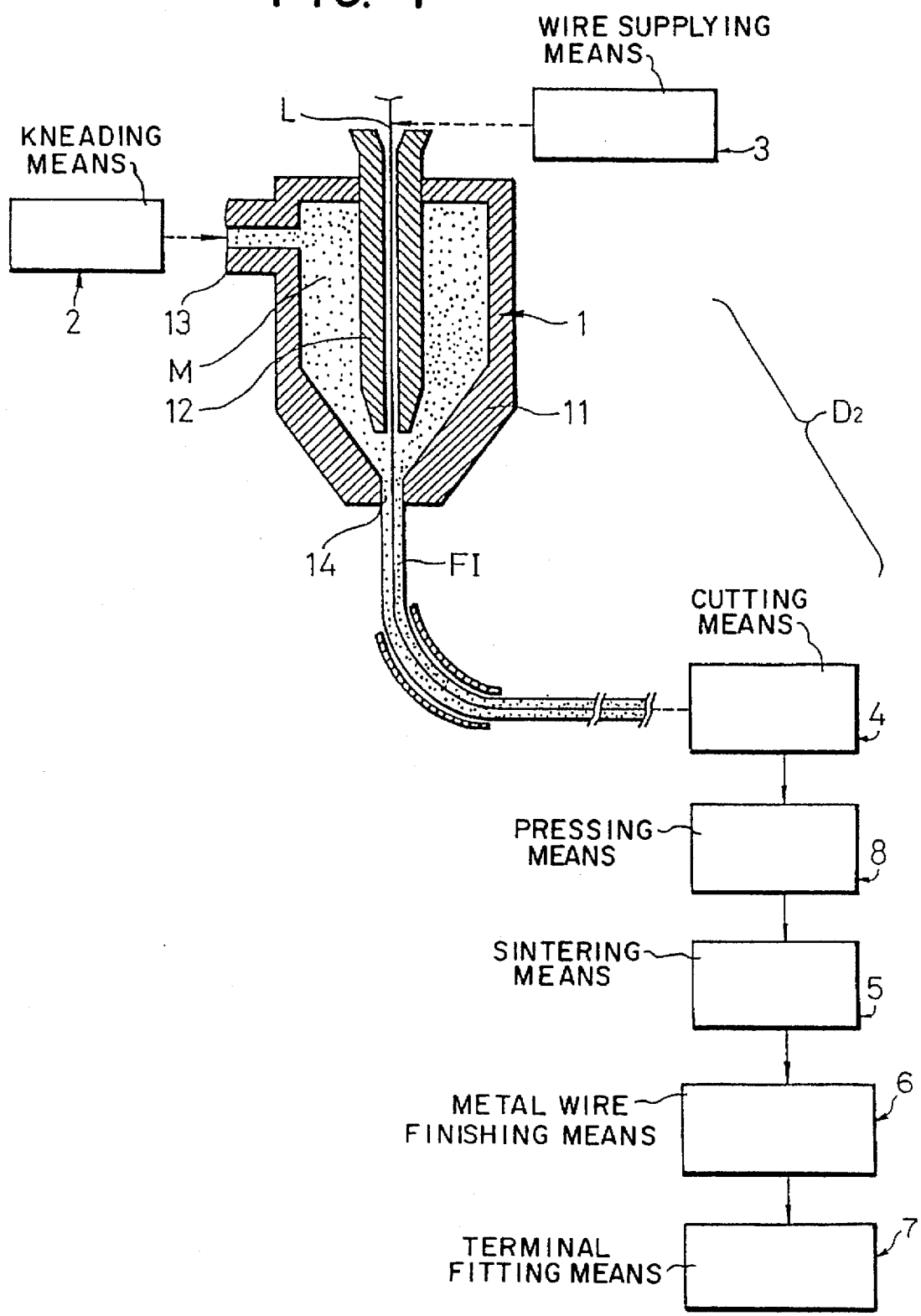
FIG. 4 is a block diagram of a production device used in Example 2.

According to the second example of this invention, an inductor (IP) shown in FIG. 5 is produced by use of a device (D$_2$) shown in FIG. 4. As both the first and second examples are common in general, only the difference between them will be described in the following.

A nearly center part of an intermediate (MI) is pressed by use of a wedge type mold (81) under a pressure of about 1 t./cm$^2$ in a pressing means (8) to reduce width thereof transverse to the long direction so as to form concave (d) on the surface.

Figure 6A:
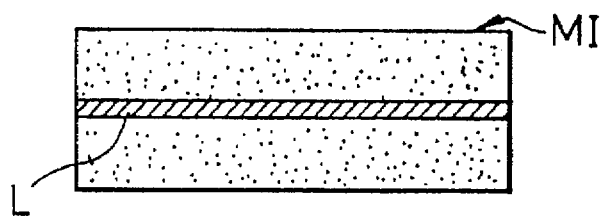
FIGS. 6(A)–(E) are section views of an inductor in each productive step of Example 2.
Figure 6B:
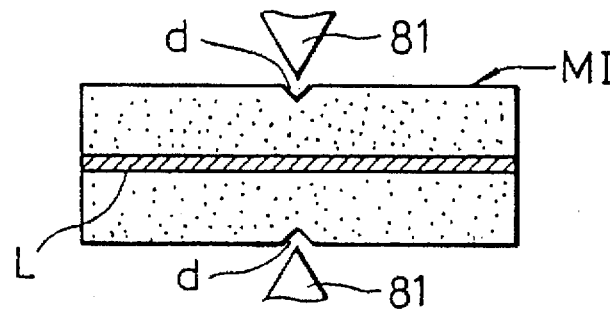

As a result of such a pressing treatment, the intermediate (MI) is reinforced in a region along the concave (d) due to an increased degree of consolidation compared with its surrounding area, thereby the conductive material (L) being secured firmly as shown in FIG. 6(B).

Figure 6C:
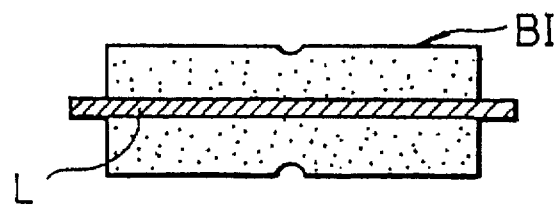
Figure 6D:
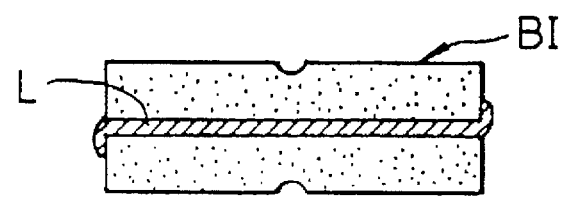
Figure 6E:
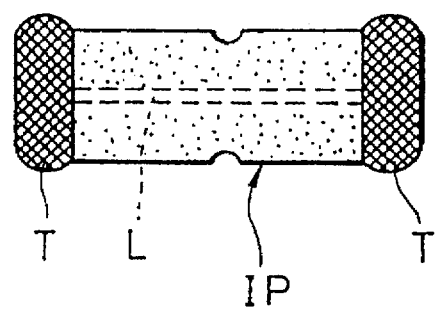

When the intermediate (MI) is sintered at a temperature of, for example, about 800° C. to 1,200° C. in a sintering means (5), the ferrite molded material (FI) in the intermediate (MI) is shrunk to form a sintered material (BI) having an external dimension of about 3.2×1.6×1.1 cm thereby the conductive material (L) being broken out of both end surfaces at a length of about 0.3 mm as shown in FIG. 6(C).

The protruded conductive material (L) from the sintered material (BI) is pressed by use of a metal line treating means (6) to bend on both end surfaces. Finally, both end surfaces of the sintered material (BI) is treated through, for example, a dipping treatment in a terminal fitting means (7) to apply an Ag paste for soldering and fitted with external electrodes (T) to complete an inductor (IP).

Preferred modifications of these examples are as in the following.

(1) As a magnetic material such as ferrite, Ni ferrite, Ni—Zn—Cu ferrite, Mn—Zn ferrite, etc. may be used.

(2) As a conductive material, Ag, Ag—Pd, Cu, etc. are also employable.

(3) Diameter of a conductive material is preferably in a range of several micron (μ)m. to several hundreds micron (μ)m.

(4) The pressing treatment may be carried out prior to the cutting step of the intermediate, and a position to be pressed and the number of treatments are variable arbitrarily.

(5) A material used for an external electrode may be Ag—Pd, Cu, etc.

(6) External electrodes may be fitted prior to the sintering of a magnetic material such as ferrite.

EXAMPLE 3

Figure 11:
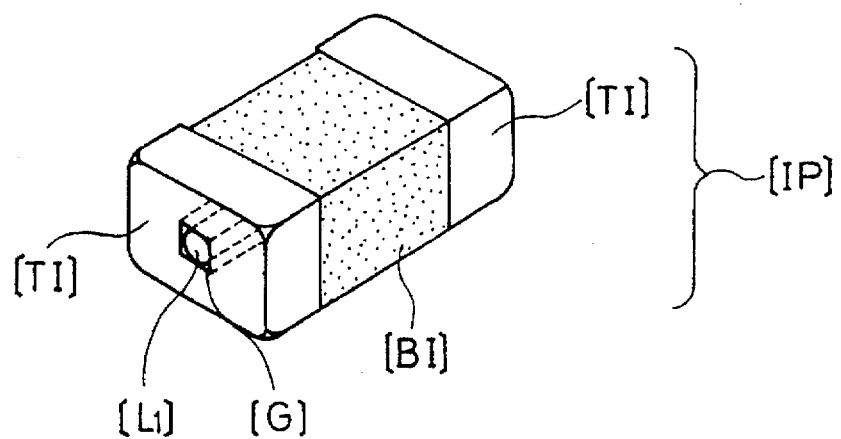
FIG. 11 is a perspective view of an electronic part produced by a production unit shown in FIG. 8.

In Example 3, a conductive wire (L$_1$) comprising a material such as Ag, Au, Ag—Pd, Pd, Pt, nichrome and the like is embedded into a magnetic material (M) of rectangular parallelepiped comprising a ferrite material such as Mn—Zn, Ni—Zn, etc. shown in FIG. 11 and an insulating or dielectric material along the long direction to form electronic parts (IP) provided with external electrodes (TI) at both ends thereof. Reference is made to a production unit (D') shown in FIG. 8, a process for making such electronic parts will be described in the following.

The production (D') unit comprises an extrusion molding means (1'), a sintering means (2'), a cutting means (3') and an external electrode fitting means (4').

Concerning the extrusion molding means 1', a guide sleeve 12' for a conductive material (L) is vertically arranged in a molding housing 11'. Ferrite and a binder resin supplied from a ferrite powder supplying means 5' and a binder supplying means 6', respectively, are thoroughly kneaded in a mixing and kneading means 7' to form the magnetic material (M), which is then supplied to the extrusion means 1' through an introducing port 13' and extruded from an extruding head 14' as an intermediate molding material (MI). The conductive wire (L$_1$) comprising a linear material such as Pt is supplied from a wire supplying means 8' to the guide sleeve 12' vertically arranged in the housing 11'.

While, a delivery portion 12A' of the guide sleeve 12' is opened in the vicinity of the extruding head 14' of the housing 11'. The magnetic material (M) and the conductive material (L$_1$) embedded therein are extrusion molded at the same time to form the intermediate molding material (MI).

Figure 8:
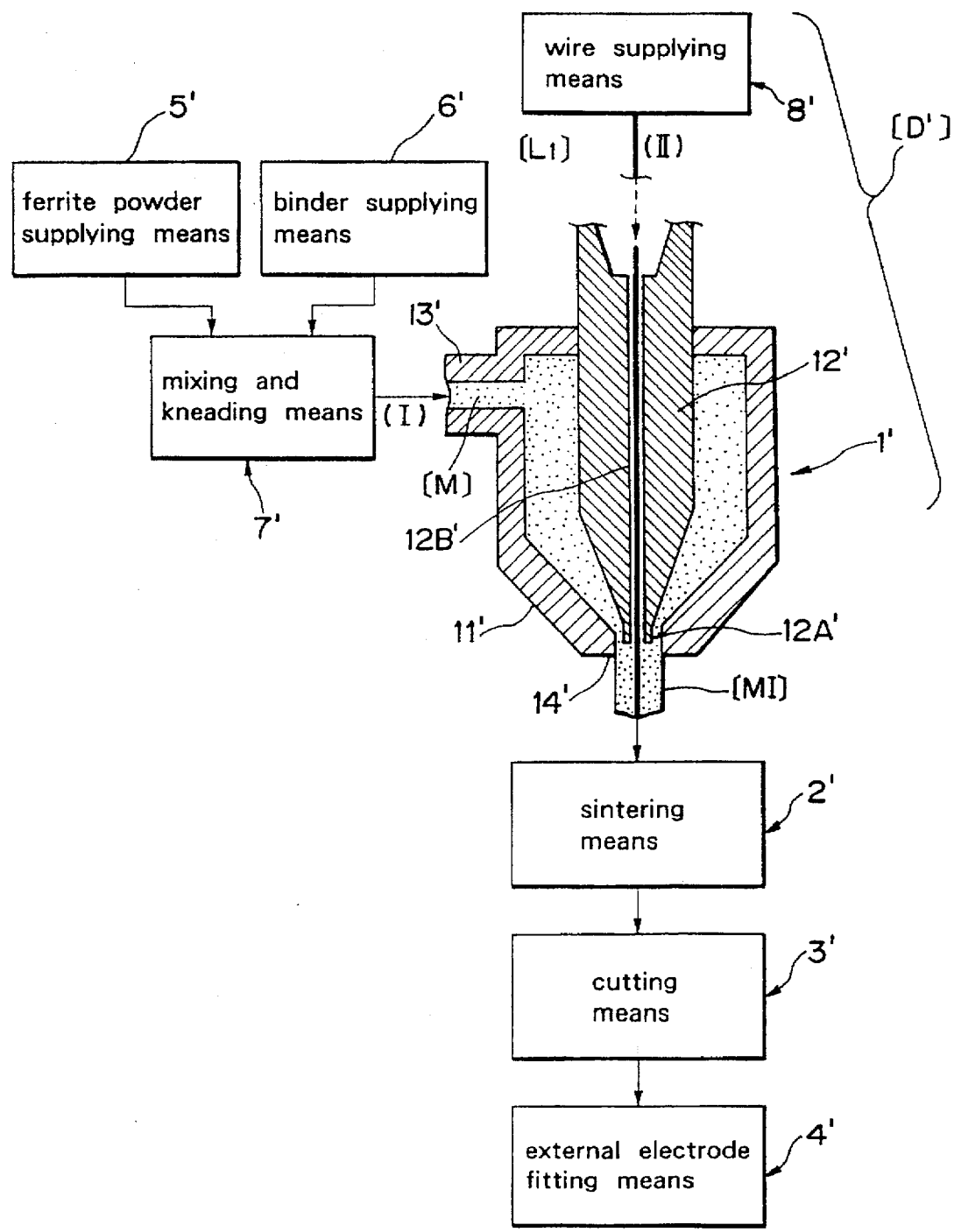
FIG. 8 is a block diagram of a production unit employed in Example 3.
Figure 9:
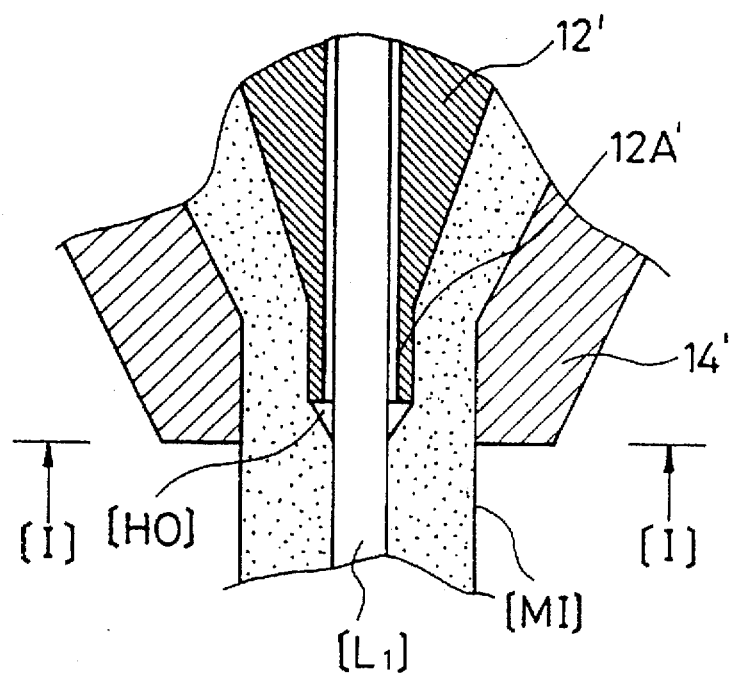
FIG. 9 is a partial longitudinal sectional view of an extruding head in FIG. 8.

The intermediate molding material (MI) is then sintered in the sintering means 2', cut transversely into a predetermined size in the cutting means 3' and finally fitted with external electrodes (TI) in the external electrode fitting means 4' to form the electronic parts (IP) such as an inductor as shown in FIG. 8. The aforementioned constitutes a whole production line of the present electronic parts.

Figure 10:
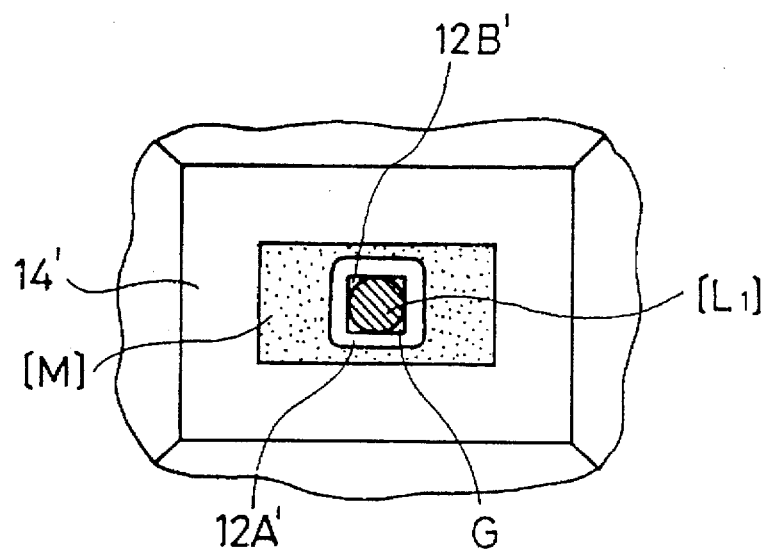
FIG. 10 is a sectional bottom view taken on line I—I in FIG. 9.

A structural feature of the production unit (D') described in Example 3 is that the delivery portion 12A' of the guide sleeve 12' has a curb like cross section as shown in FIG. 10 and the conductive material (L$_1$) having a circular cross section is delivered through an inner delivering opening 12B'.

A method for making the present electronic parts by use of the production unit (D') will be described in the following.

Powder of Ni—Zn ferrite, a binder resin and an appropriate solvent are kneaded thoroughly in the mixing and kneading means 7' to form the magnetic material (M) in a pasty condition. The pasty magnetic material (M) is introduced into the molding housing 11' from the introducing port 13' through a production line (I), while the conductive material comprising a linear material such as Pt is introduced in the guide sleeve 12' from the wire supplying means 8' through a production line (II).

In such a situation described above, the conductive material (L$_1$) is introduced from the delivery portion 12A' located at the bottom of the guide sleeve 12', while the magnetic material (M) is supplied to an outer periphery thereof. A curb hollow-core (HO) is formed in the magnetic material (M) by means of the delivery portion 12A' of the guide sleeve 12'. The magnetic material is then simultaneously extrusion molded with the conductive material (L$_1$) embedded therein so that a part of the latter (L$_1$) is not contacted with the hollow-core (HO) to leave a space (G). The intermediate molding material (MI) thus obtained has such structure that the conductive material (L$_1$) of a circular cross section is fallen into the curb core (HO). If necessary, the intermediate molding material (MI) may be cut into rods of a certain length, which makes it possible to conduct the following procedure in a batch-wise manner.

The intermediate molding material (MI) is supplied to the sintering means 2' and heated at a heat-up rate of, for example, about 100° C./hr. so as to heat the magnetic material (M) to a temperature of about 900° C. Further heat-up thereof at 200° C./hr. allows the ferrite to shrink up to about 15%, thereby resulting in a sintered product (BI) having about 85% of the original dimension. Each of Pt, Pd, Au and Ag comprised in the conductive material (L$_1$) has a softening temperature of 1,774° C., 1,555° C., 1,063° C. and 961° C., respectively, and is only expanded or shrinked but is not melted during the sintering treatment. The conductive material ($L_1$) is finally embedded as a wire of about 0.085 mm diameter in the magnetic material (M) in a stable condition. Because of a difference in the thermal expansion coefficient between the conductive material ($L_1$) and the magnetic one (M), as described before, relative shifting of these materials would generally be developed. In the case of Example 3, however, the conductive material ($L_1$) and the magnetic material (M) are simply contacted with each other in part through the space. Accordingly, no internal stress is accumulated, thereby substantial impedance properties stable enough to yield the electronic parts (IP) in high quality being obtainable.

The intermediate molding material (MI) is then cut into predetermined length in the cutting means by use of an appropriate cutting device such as a dicing saw.

The intermediate molding material (MI) is then fitted with external electrodes (TI) at both ends thereof by, for example, dipping the former (MI) in a pasted plate to form desired electronic parts (IP) such as a tip inductor.

EXAMPLE 4

Figure 12:
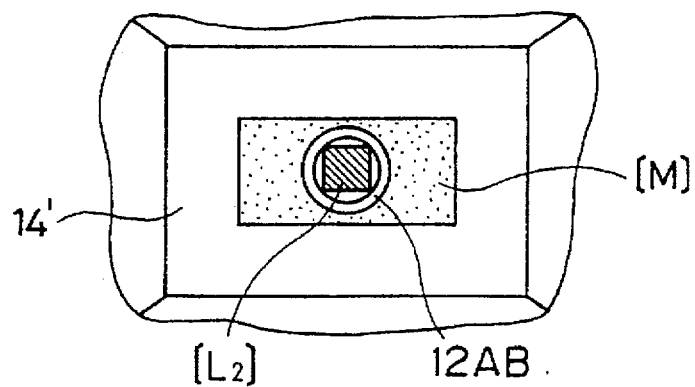
FIG. 12 is a bottom view of an extruding head of Example 4.
Figure 13:
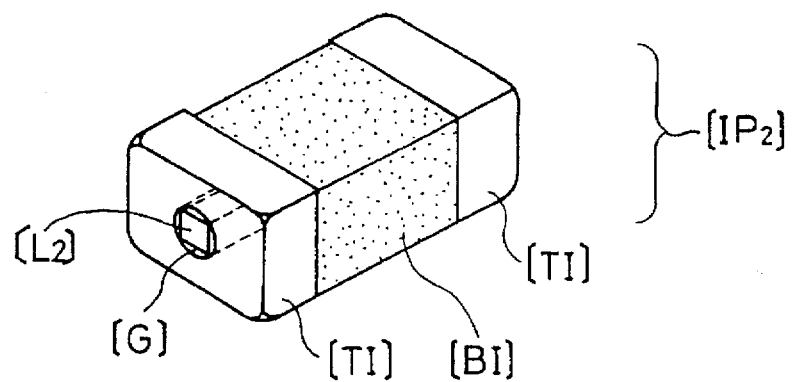
FIG. 13 is a perspective view of an electronic part produced by a production unit of Example 4.

An electronic part of Example 4 is shown in FIGS. 12 and 13. A conductive material ($L_2$) supplied from the delivery portion 12A' of the guide sleeve 12' has a square cross section, while a delivery portion 12AB of the guide sleeve 12' for guiding the conductive material ($L_2$) is cylindrical. This is the only difference between two examples and other features thereof are common. Although there exists a difference in the shrinkage factor, the intermediate molding material (MI) is sintered without accumulating internal stress between the conductive material ($L_2$) and the magnetic material ($L_2$) and the magnetic material (M) because of a presence of space between them. Such a structural feature of Example 4 can provide electronic parts ($IP_2$) in high quality.

EXAMPLE 5

Figure 14:
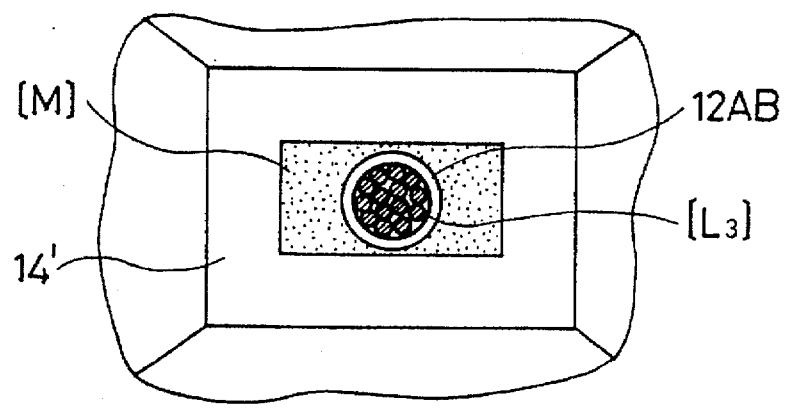
FIG. 14 is a bottom view of an extruding head of Example 5.
Figure 15:
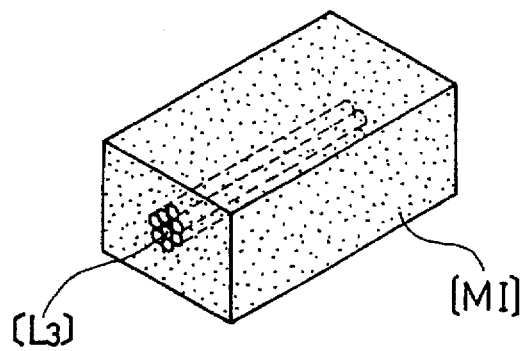
FIG. 15 is a perspective view of an intermediate molding material of a production unit of Example 5.

As shown in FIGS. 14 and 15, a plurality of fine linear conductive materials ($L_3$) are arranged in the guide sleeve 12' and embedded into the magnetic material (M) at the delivery portion 12AB to form the intermediate molding material (MI).

In Example 5, there also exists a space between each of conductive materials ($L_3$) and the magnetic material (M), thereby the intermediate (MI) being sintered without developing an accumulation of internal stress similarly as described in Examples 3 and 4.

EXAMPLE 6

Figure 16:
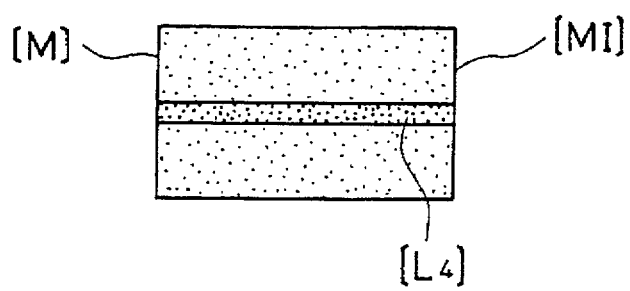
FIG. 16 is a side view of an intermediate molding material of Example 6.

An intermediate molding material (MI) of Example 6 is shown in FIG. 16. A porously molded metal of relatively lower melting point is used as a conductive material ($L_4$). The conductive material ($L_4$) tents to soften and reduce volume thereof, thereby avoiding an accumulation of internal stress between the conductive material ($L_4$) and the magnetic material (M).

It is not shown in the drawings but has been confirmed that the development of internal stress is effectively controlled by intentional crack formation on the surface of the magnetic material (M) caused by thermal or physical shock as a thermodynamic phenomenon, or the magnetic material (M) and the conductive material (L) are conveniently separated by use of heat or electric current.

What is claimed is:

1. A method for making electronic parts comprising:

supplying a conductive material to an extruding means where a pasty magnetic material is to be charged;

extruding said magnetic material with said conductive material to be embedded therein to mold an intermediate;

sintering said intermediate to form a sintered material thereby partially exposing two external end surfaces of said magnetic material and said conductive material protruding outwardly from each of said two external end surfaces of said magnetic material;

subjecting said conductive material, which protrudes outwardly from each of said two external end surfaces of said magnetic material, to a flattening treatment; and connectively fitting external electrodes to each of said two external end surfaces of said sintered material.

2. A method as recited in claim 1 wherein a center portion of said intermediate is pressed to reduce width thereof transverse to the longitudinal direction.

3. A method as recited in claim 1 wherein said electric part consists of an inductor.

4. A method as recited in claim 1 wherein said conductive material is selected from Pt, Ag, Pd or an alloy thereof.

* * * * *